(12) United States Patent
Dabrowski et al.

(10) Patent No.: US 11,102,660 B2
(45) Date of Patent: Aug. 24, 2021

(54) METHOD FOR PROVIDING AN OPTIMIZED PLACEMENT OF WI-FI MESH NETWORK EXTENDERS

(71) Applicant: ADVANCED DIGITAL BROADCAST SA, Bellevue (CH)

(72) Inventors: Bartosz Dabrowski, Zielona Gora (PL); Damian Piotrowski, Zielona Gora (PL)

(73) Assignee: ADVANCED DIGITAL BROADCAST S.A., Bellevue (CH)

( * ) Notice: Subject to any disclaimer, the term of this patent is extended or adjusted under 35 U.S.C. 154(b) by 0 days.

(21) Appl. No.: 16/878,714

(22) Filed: May 20, 2020

(65) Prior Publication Data

US 2020/0413265 A1    Dec. 31, 2020

(30) Foreign Application Priority Data

May 22, 2019   (EP) .................................... 19175932

(51) Int. Cl.
| *H04W 16/18* | (2009.01) |
| *H04B 7/155* | (2006.01) |
| *H04W 24/10* | (2009.01) |
| *H04W 88/08* | (2009.01) |

(52) U.S. Cl.
CPC ........ *H04W 16/18* (2013.01); *H04B 7/15514* (2013.01); *H04W 24/10* (2013.01); *H04W 88/085* (2013.01)

(58) Field of Classification Search
CPC ...... H04W 88/16; H04W 88/08; H04W 88/10
See application file for complete search history.

(56) References Cited

U.S. PATENT DOCUMENTS

| 2006/0056370 A1* | 3/2006 | Hancock | ................. H04L 1/203 370/338 |
| 2010/0278072 A1* | 11/2010 | Robinson | .............. H04W 16/18 370/254 |

\* cited by examiner

*Primary Examiner* — Kevin Kim
(74) *Attorney, Agent, or Firm* — Mark M. Friedman (57) ABSTRACT

A method for determining placement of a wireless, mesh network extender, the method comprising the steps of: establishing a connection with a wireless mesh network comprising a Central Access Point; building (401) a list of points of measurement of signal quality of said wireless, mesh network; outputting (403) a suggestion as to the placement of a new Mesh Access Point on a calculation of potential signal quality derived from said list (401).

8 Claims, 9 Drawing Sheets

METHOD FOR PROVIDING AN OPTIMIZED PLACEMENT OF WI-FI MESH NETWORK EXTENDERS

TECHNICAL FIELD

The present invention relates to wireless network communication and wireless network architecture. In particular, the present invention relates to Wi-Fi Mesh networking. The present invention relates to the process of installation of the aforementioned Mesh network i.e. to the process of placement and configuration of hardware.

BACKGROUND OF THE INVENTION

With the popularization of mobile devices and wireless networking combined with the ever increasing need for mobility wireless communication becomes a mainstream direction of development of device communication. One exemplary area of such communication is Wi-Fi networking defined by IEEE 802.11a, IEEE 802.11b, IEEE 802.11g, IEEE 802.11n, IEEE 802.11ac and the like. With these standards widely established, there is a need to provide uniform coverage by the wireless network in order to keep device communication uninterrupted and reliable. This issue is addressed by Wi-Fi Mesh standard. A widely acknowledged standard of the Wi-Fi Mesh networking is IEEE 802.11s.

The present invention assumes in all its descriptions that devices operate using IEEE 802.11s. However, a person skilled in the art will easily recognize that IEEE 802.11s is not the only wireless networking standard this method may utilize, which is in no way limiting to the present invention. In general, the present invention is applicable to wireless networking operating using network coverage extenders.

Therefore, while a Wi-Fi network is understood as a plurality of devices connecting to one central router device, a Wi-Fi Mesh is understood as a plurality of devices connecting to a plurality of Wi-Fi Mesh Access Points (hereinafter referred to as MAPs), the MAPs collaborating together in order to provide seamless network connection to the connected devices regardless of which MAP is used for this purpose.

Typically, a characteristic feature of a Wi-Fi Mesh network is that one of the MAPs serves as a gateway to a wider network e.g. the Internet. This MAP will typically be a master for all other MAPs i.e. will perform some centralized functions that other MAPs do not execute. Such an exemplary function is ports mapping or a DHCP service. This master MAP is called a Central Access Point or CAP hereinafter.

The process of installation of the entire Wi-Fi Mesh network comprises the following steps:
  an installation of a CAP;
  an installation of a first MAP;
  optionally, an installation of other MAPs.

A person skilled in the art will recognize that in case there are not any MAPs installed, in addition to CAP, the Wi-Fi Mesh network effectively becomes a Wi-Fi network. This is in no way limiting to the present invention as it relates to the process of installation of a MAP.

The present invention attempts to improve a method for installation of MAPs in order for the wireless network to provide a uniform coverage. Known solutions typically comprise a simple set of rough guidelines as to the placement of a MAP relatively to the already established placement of a CAP: for example one MAP per room or one MAP per given distance.

Other existing solutions provide complex mapping software solutions that rely heavily on mapping of the physical environment and performing precise measurement. It is due to the complexity they are often very expensive or limited to professional use only or available only on laptop PC and not a mobile device e.g. a smart-phone.

These solutions are seen in commercial products like Ekahau HeatMapper software or VisiWave program. Even existing mobile device solutions like Wi-Fi Heatmap rely heavily on physical mapping of the environment and/or the presence of the map of the environment beforehand. The present invention attempts to overcome this limitation.

There also exist solutions attempting at improvement of quality of service in a wireless environment. An exemplary solution is found in a patent number EP 3 174 328 B1. The publication teaches a method of caching and/or mapping information about network coverage by means of storing network signal parameters and their associated locations in order to suggest a user to alternate their location or position in order to maximize the quality of network.

The present invention attempts to optimize the wireless network in order to maximize the quality of network without the need of later interaction with the users of this network in the environment or conditions where mapping the environment to a device i.e. creating a digital map of the area is not possible or otherwise difficult or not desired. Hence, the present invention provides a simpler method that works around the unavailability of the aforementioned digital map.

SUMMARY AND OBJECTS OF THE PRESENT INVENTION

A method for determining placement of a wireless, mesh network extender, the method comprising the steps of: establishing a connection with a wireless mesh network comprising a CAP; building a list of points of measurement of signal quality of said wireless, mesh network; outputting a suggestion as to the placement of a new MAP on a calculation of potential signal quality derived from said list.

Preferably, said list of points of measurement of signal quality of said wireless, mesh network comprises points in space denoting signal strength of said network.

Preferably, said method further comprises a step of defining a plurality of relations between pairs of measurement points.

Preferably, a relation defines points belonging to the same room.

Preferably, said potential signal quality is based on a score assigned.

Preferably, said score assigned is assigned as a result of a method comprising the steps of: selecting a measurement point; assuming a default value of its score; checking for a next available measurement point and if present, computing a quality measure for all measured points in the associated location; computing a distance N from the measurement point to the currently selected location; finding all measurement points whose distance from their respective MAPs is equal to N; computing a combined signal quality for all measurement points found at the finding step in order to arrive at a potential signal quality; checking whether the computed potential signal quality is better than said quality measure for all measured points in the associated location and if it is, updating the score; moving back to the step of checking for a next available measurement point and repeating the remaining steps in order to find the highest available potential signal quality.

Preferably, said method further comprises a step of obtaining a measurement of the quality of said wireless mesh network at the suggested target location and providing a feedback.

Preferably, said measurement of signal quality is selected from a group of: a normalized value of RSSI (Received Signal Strength Indicator); an RSSI value from the CAP or a MAP that the respective measuring client device is connected to; data transfer rate to or from a specific location on the network.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

BRIEF DESCRIPTION OF THE DRAWINGS

These and other objects of the invention presented herein, are accomplished by providing system and method for an optimized placement of Wi-Fi Mesh network extenders. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

Figure 1:
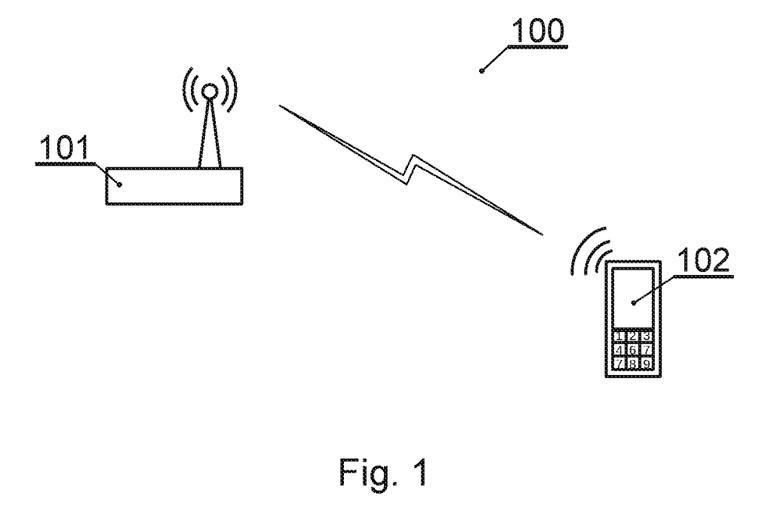
FIG. 1 presents a Trivial Mesh comprising only a CAP device.

An exemplary embodiment of the present invention is a method of improvement of installation of a MAP device in a Wi-Fi Mesh network. The method starts its operation with a Wi-Fi Mesh network containing only a CAP device. Such Wi-Fi Mesh network is called a Trivial Mesh network hereinafter. An exemplary Trivial Mesh is depicted in FIG. 1. The network 100 comprises a CAP device 101 and one or more of connected client devices 102. In this network each client device 102 is connected directly to the CAP device 101.

Figure 2:
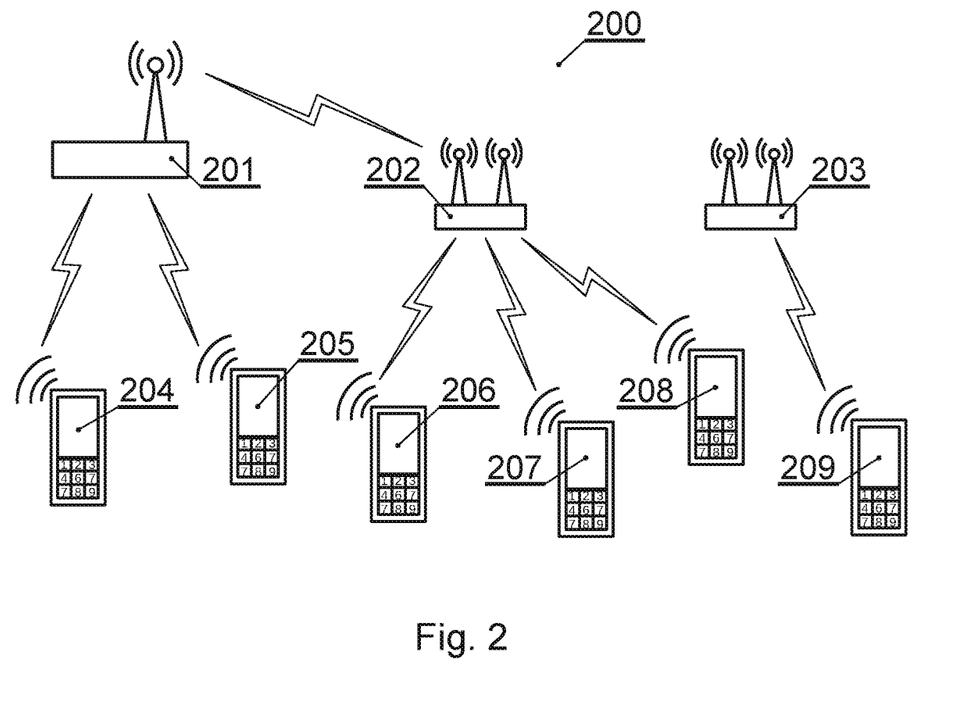
FIG. 2 presents a Wi-Fi Mesh network comprising a CAP and MAP devices.

The method targets building a Wi-Fi Mesh network 200, an example of which is depicted in FIG. 2. In particular, FIG. 2 presents a Wi-Fi Mesh network comprising a CAP device 201 and two MAP devices 202 and 203. Additionally, a plurality of client devices 204 through 209 are connected to one of the MAPs or the CAP. An exemplary device 205 is connected directly to the CAP 201 while device 208 is connected to the MAP 202. It is the feature of Wi-Fi Mesh network 200 that all clients 204-209 receive the same network experience and functionality regardless of which CAP 201 or MAP 202-203 they are connected to.

The method operates by determining one MAP target location at a time. A person skilled in the art will appreciate that the methods of the present invention may be applied recursively to build a Wi-Fi Mesh network with more than one MAP.

The method according to the present invention will typically be executed on a mobile device that can easily and quickly be transported from one place to another within the desired area of coverage of the target Wi-Fi Mesh. Therefore, the device will typically comprise a smart-phone or a tablet or a portable computer. The device may also comprise one dedicated and especially designed for this purpose e.g. comprising a high-end measurement hardware or dedicated displays or be waterproof or the like. However, the use of other devices is in no way limiting to the present invention, it is typically merely less convenient.

Figure 3:
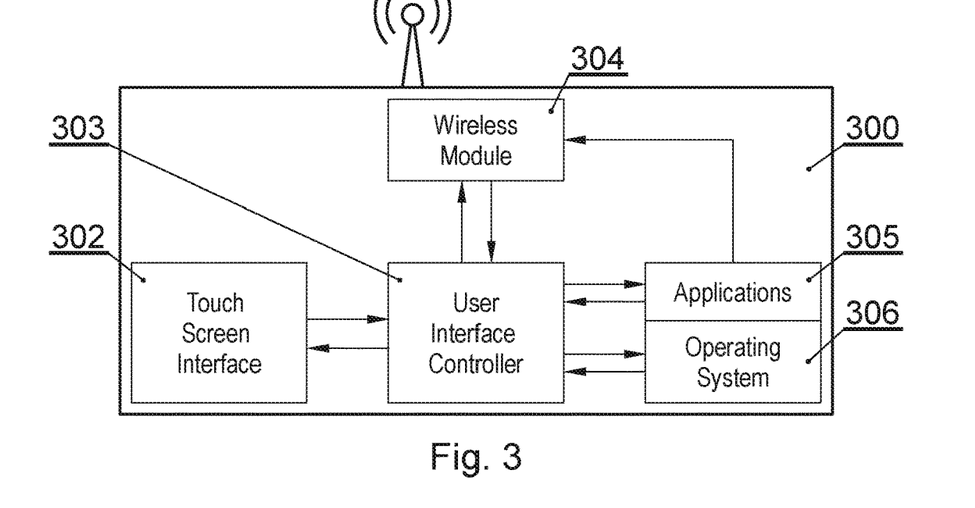
FIG. 3 presents an exemplary device able to execute the method of the present invention.

An exemplary device 300 executing the present method of the present invention is shown in FIG. 3. The device 300 typically comprises an operating system 306, running core services of the device, coupled with a user interface controller 303. For the purpose of the present embodiment of the present invention the device comprises a touch screen interface 302 the interface being able to display GUI and receive input from the user.

In this respect the device behaves as a popular smartphone. However, use of other display and/or input means is in no way limiting to the present invention. The device 300 also comprises applications module 305. Typically, the method of the present invention will be executed by this module using other modules as means of communication or data source only. The device 300 also comprises a wireless module 304 to communicate via Wi-Fi with CAP and other devices.

Figure 4:
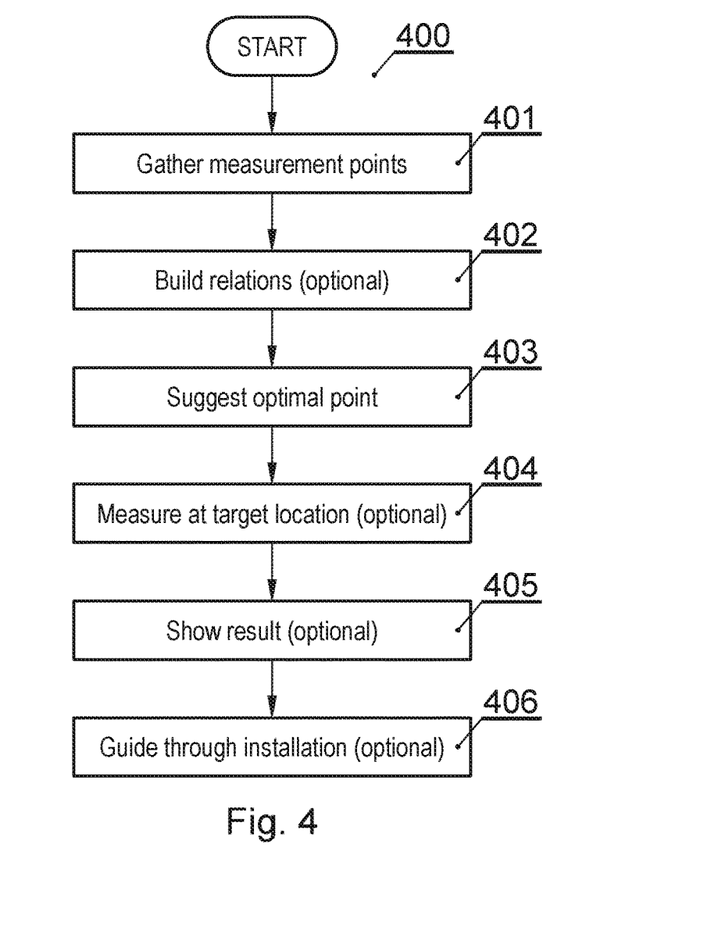
FIG. 4 presents an overview of the method of the present invention.

A high level view 400 of the method according to the present invention is shown in FIG. 4. The method starts at step 401 with building a list of points of measurement of Wi-Fi Mesh quality. This builds a list of points in space denoting signal strength of the network comprising the network's coverage. Typically the user will be asked to select the points so that later the MAP device may be potentially placed at one of those locations.

Next, the method optionally builds a plurality of relations between pairs of measure points at step 402. A relation will typically define points belonging to a same room. This is derived from the fact that typically a Wi-Fi signal strength of a device will be stronger if received at same room then if received at another room even if distance in space is smaller in the latter case. A skilled person will appreciate that this step may be omitted and the method will still provide viable results. However, the presence of this step is considered beneficial as it may improve the quality of positioning presented in subsequent steps.

Subsequently, at step 403, the method provides a suggestion as to the placement of the newly installed MAP based on calculation of potential signal quality and respective score assigned (see method 900 of FIG. 9). Finally, the method gathers a measurement of the quality of Wi-Fi Mesh network at the target location at step 404 and provides feedback e.g. to the user at step 405. Optionally, the method may guide the user through the specifics of the installed MAP in order to power it on correctly and configure for connection to the network. This is presented at step 406. Steps 404-406 are considered optional as shown in FIG. 4. Thus, the key steps 401 and 403 are used to obtain a suggestion regarding a MAP placement according to gathered data.

A skilled person will appreciate that the measurement of quality of Wi-Fi Mesh network may be done in a variety of ways. An exemplary method is to compute a normalized (e.g. to a range of 0÷100) value of RSSI read directly from the devices radio. Another exemplary method measurement of quality of Wi-Fi Mesh network is reading RSSI value from the CAP or MAP device that the device is connected to. Another example of measurement of quality of Wi-Fi Mesh network is measurement of data transfer rate to or from a specific location on the network.

A skilled person will also appreciate that whenever a 'suggestion' is mentioned in the present description, the user of the device may actually not follow it or follow it only to some extent. It is to be noted that despite this the method of the present invention will still operate correctly having only in mind that the final result would be more satisfactory for the user had they followed the suggestions more precisely. The correction of this issue provides no limitation to and remains beyond the scope of the present invention.

A more detailed description of the method of the present invention is provided in FIGS. 5A through 5D. The method 500 starts with realization of step 401 of method 400. The method 500 asserts that the device executing it is connected to the Wi-Fi network (wireless network in general) whose extension is being realized e.g. to be able to determine the quality of the network's signal. Since this is the only network that the present invention describes, this Wi-Fi network is referred to as Wi-Fi hereinafter. At step 501 the method asks the user to move to a measurement location of their choosing. At step 502 a measurement of the quality of the tested Wi-Fi network is taken and preferably presented to the user.

Figure 5A:
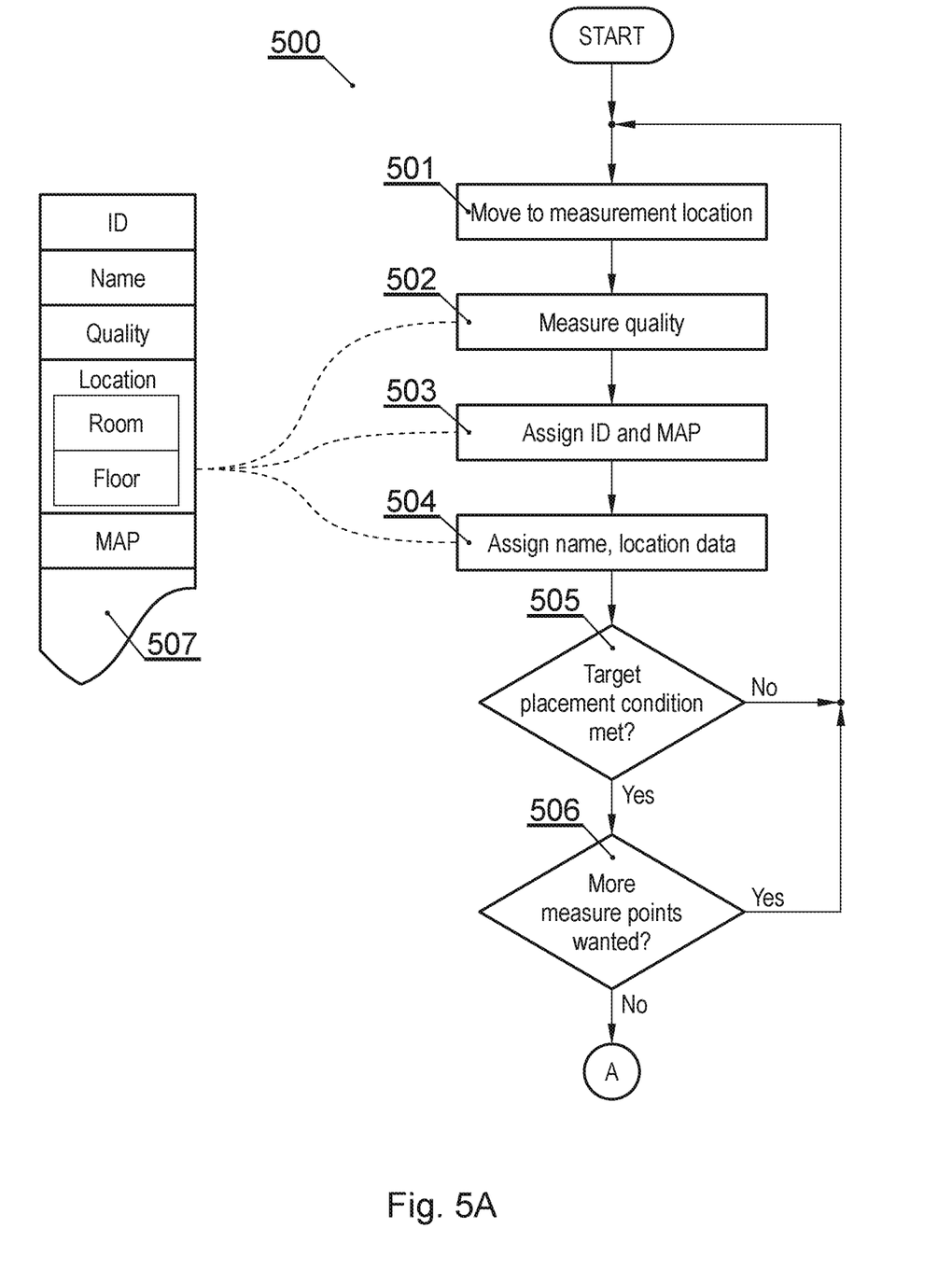
FIGS. 5A through 5D present a detailed view of the method of the present invention.

Subsequently, at step 503 a unique ID is assigned to the measurement so that it can be recognized by the system at a later time and additionally the MAP the device is connected to is recorded for use by subsequent methods. At step 504 the user is asked to assign identification to the measurement point. Typically, the said identification will contain room name and a floor name. Other set of information may be chosen to identify the measurement point location. However this is in no way limiting to the present invention.

An exemplary measurement point record is depicted as 507 and comprises fields: ID, name, quality measurement, location data which here contain room identification and floor identification. Next, the method moves to step 505 to check if after the measurement is done the target placement condition is met. The condition may comprise a minimum number of measurements made. The condition may also comprise a more complicated method.

An exemplary condition will check whether there exists a measurement point in the already done measurement point set that has a quality value of less than a maximum quality available. Preferably, the condition will also include a minimum number of measurement points done. If said condition is not met at step 505, the method moves back to step 501 to gather more measurement points. If the condition is met at step 505, the method moves on to step 506 to check if the user is willing to provide more measurement points. If so, the method moves back to step 501 to gather more measurement points.

Figure 5B:
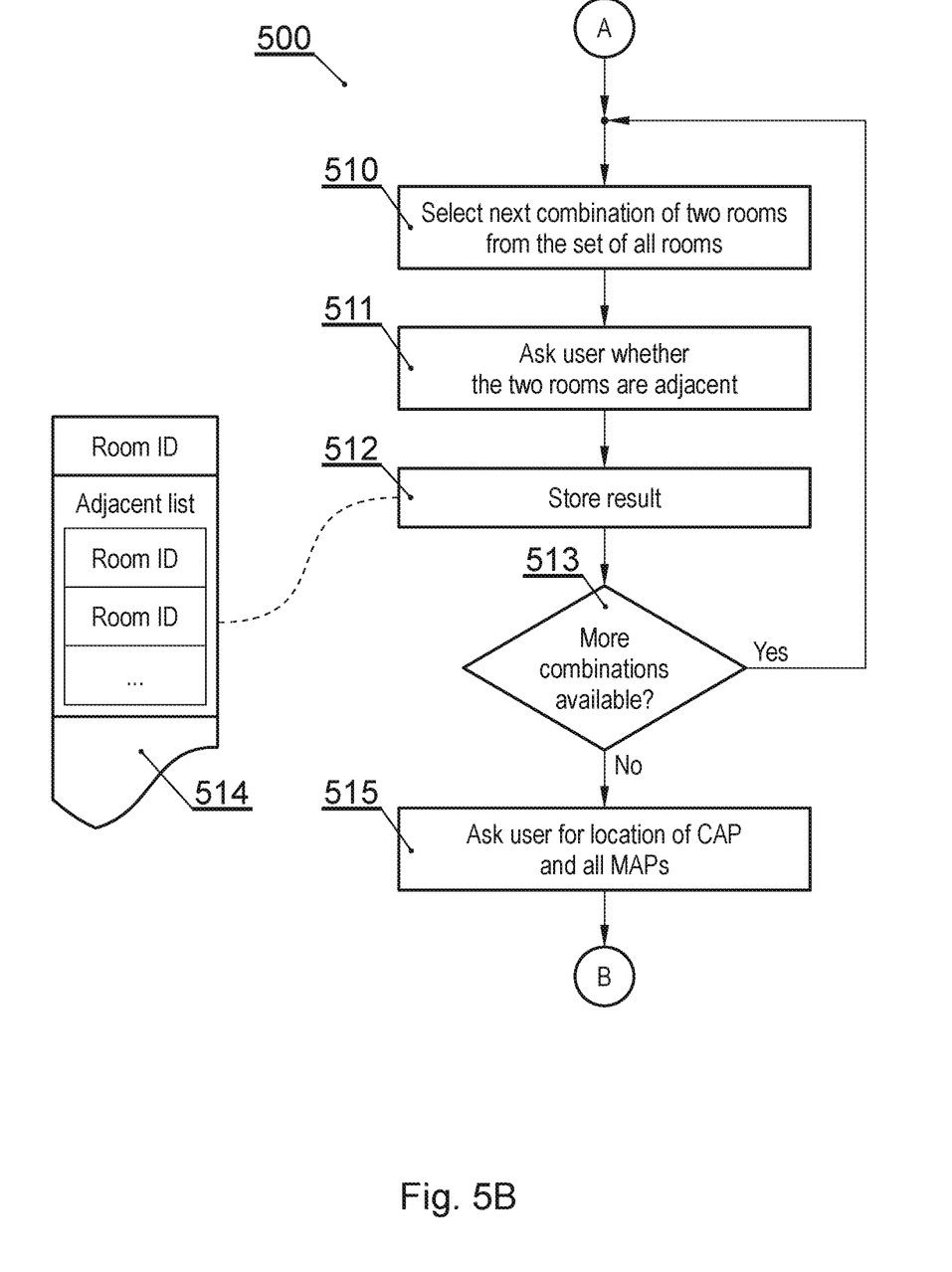

Otherwise, the method moves on to step 510 of FIG. 5B that begins realization of the optional step 402 of method 400. At step 510, the method 500 selects a combination of two rooms from the set of all rooms previously obtained i.e. provided by the user or from another data source such as a database. A combination is to be understood as a subset of distinct elements selected from a set. Next the method obtains information whether two given rooms are adjacent i.e. obtains this information from the user at step 511 or from a dedicated database in order to determine whether the two rooms are adjacent.

The result is stored in the records of both rooms. An exemplary embodiment of such storage is a related room(s) record 514 containing references to all adjacent rooms of the room. In such case the step 512 shall store the reference to the other room in the record of each room of the selected combination if and only if the user confirmed the adjacency of the rooms.

Next, at step 513, the method checks if there are more combinations available and if so moves back to step 510 to process the next combination. A skilled person will appreciate that this step may allow all possible combinations to be processed but may also introduce a process aimed at further limiting the number of combinations processed by e.g. applying some external data.

If no more combinations are available at step 513, the method moves on to step 515 and gathers information, preferably obtains it from the user, about location of CAP and all MAP devices in the network. The location information needs to be connected to the kind of information gathered at step 504. Following the presented example, the location of CAP/MAP will be indicated by a room name and a floor name. Next, the method moves to step 520 of FIG. 5C. This step begins the realization of step 403 of method 400.

Figure 5C:
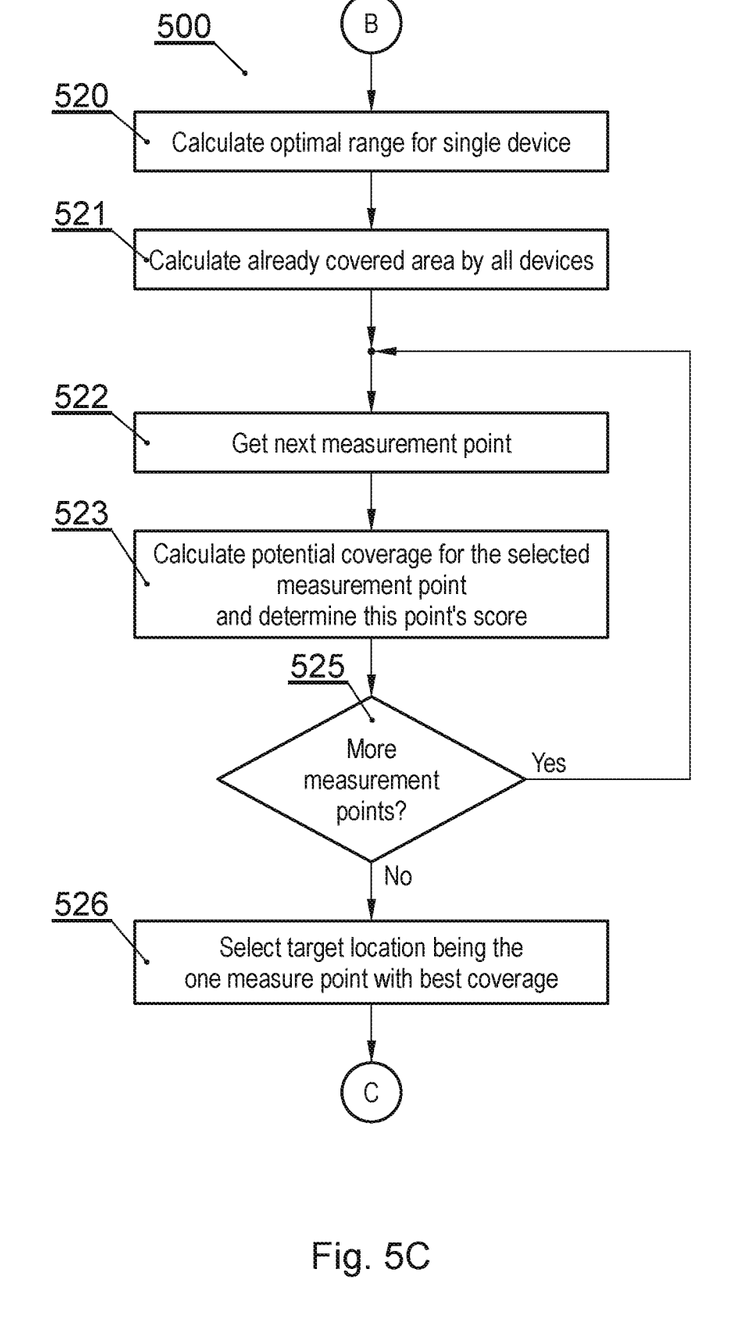

First the method 500 determines an optimal range or an optimal quality value for a target location. This value depends on a selected quality measurement method. An exemplary optimal value for a 5 degree quality measurement (excellent, good, medium, poor, none) is selected as the middle value: medium. Another exemplary optimal value comprises a range: good, medium.

Figure 6:
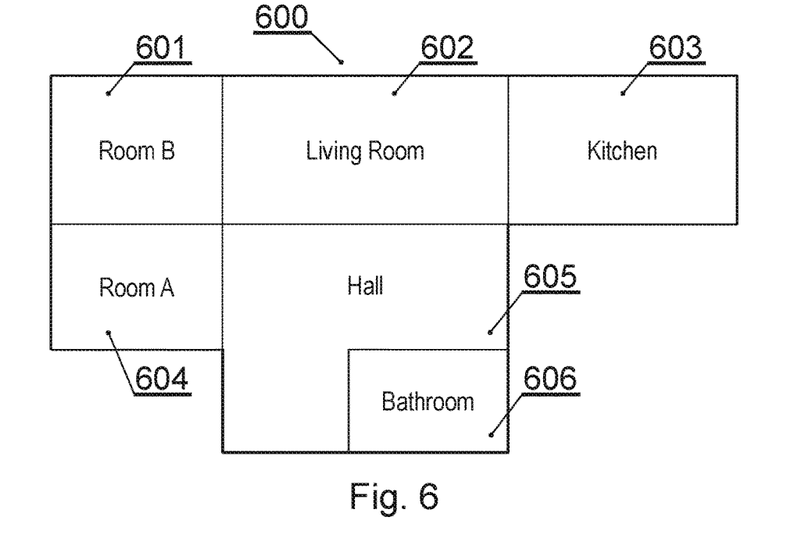
FIG. 6 presents an exemplary Wi-Fi Mesh environment layout.
Figure 7:
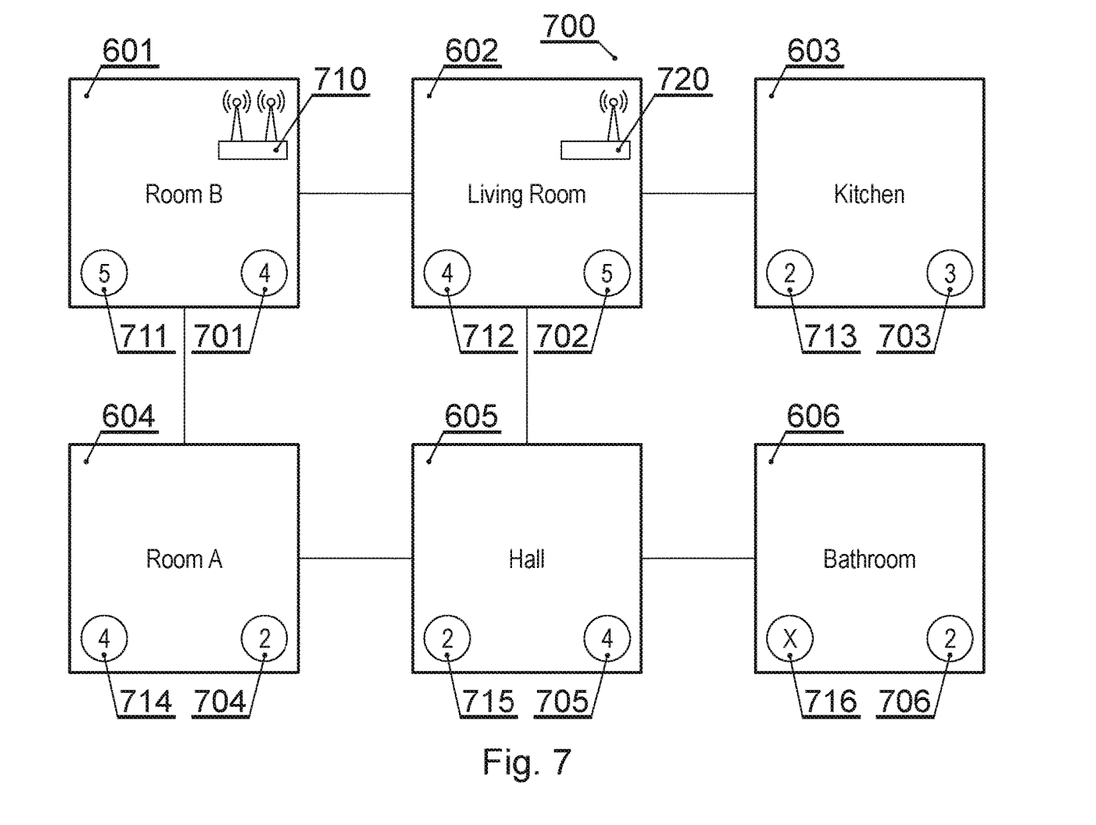
FIG. 7 presents a measured room graph representation for one potential placements of a new MAP.
Figure 8:
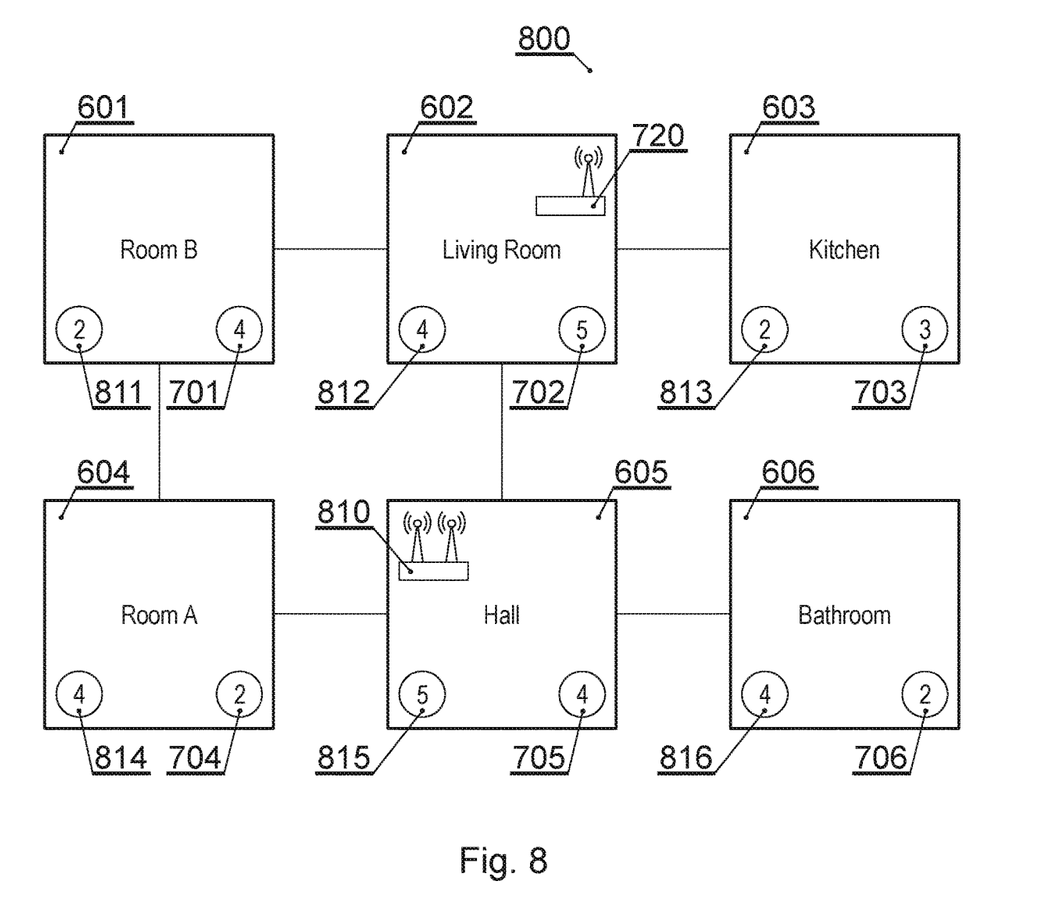
FIG. 8 presents a measured room graph representation for another potential placements of a new MAP.

Next, at step 521, the method calculates the coverage of all devices in the network. This includes CAP and all MAP devices. The calculation is best depicted in FIGS. 6, 7 and 8 and explained in their corresponding description.

Subsequently, at step 522, the method selects a measurement point from the list of provided measurement points. Next, at step 523, the method calculates the potential coverage resulting from placing the new MAP at the location of the measure point and assesses the score of this measure point. This score needs to be comparable to other such values in order to select the best potential score/coverage.

Figure 9:
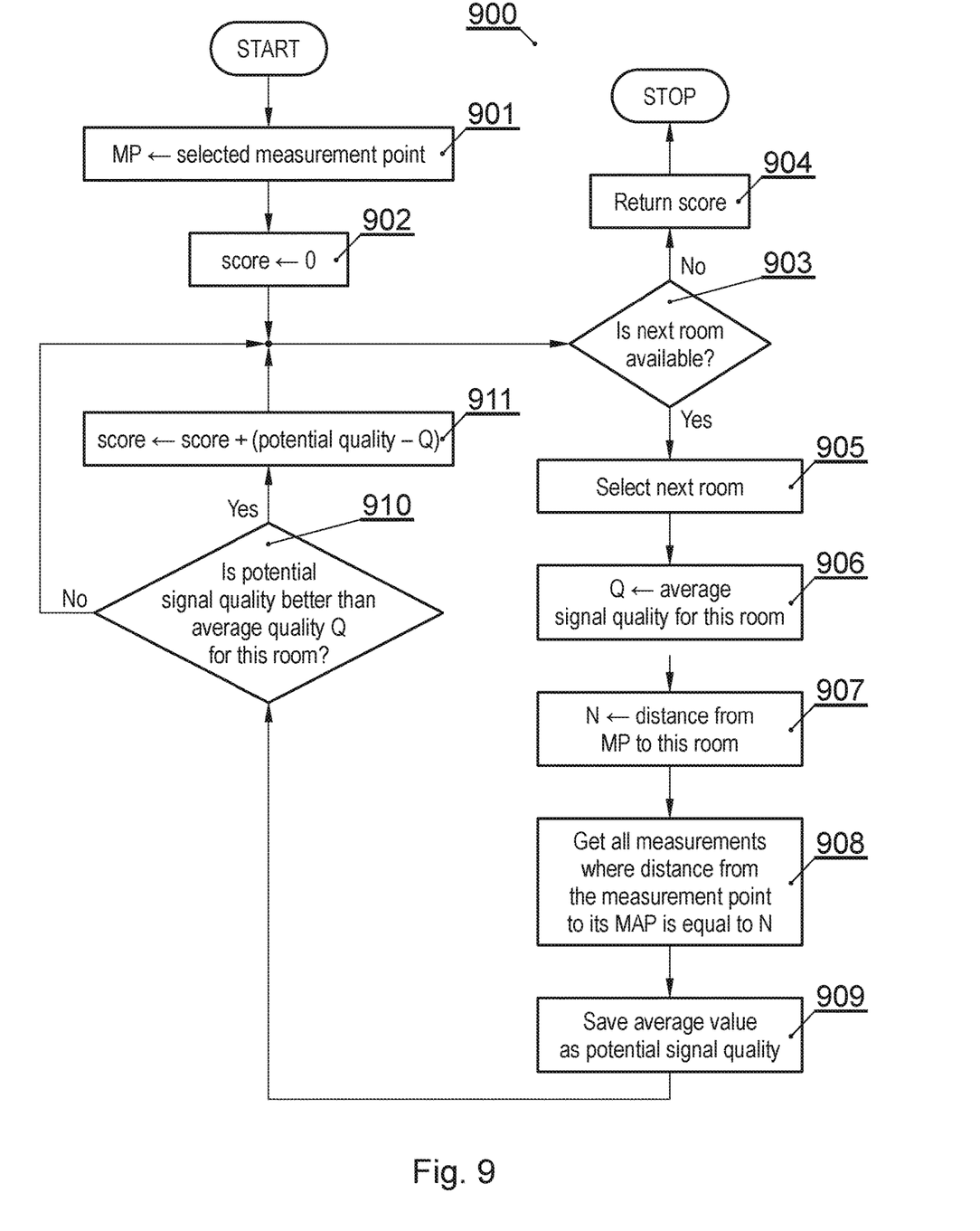
FIG. 9 presents a method of computing a score for a measurement point.

The method of calculating the potential coverage score is provided by method 900 of FIG. 9.

Next, at step 525, the method checks if there are more measurement points available and if yes, moves back to step 522 to process the next measurement point. If not, the method selects at step 526 the target location based on score calculated at step 523 and moves on to step 530 of FIG. 5D.

Figure 5D:
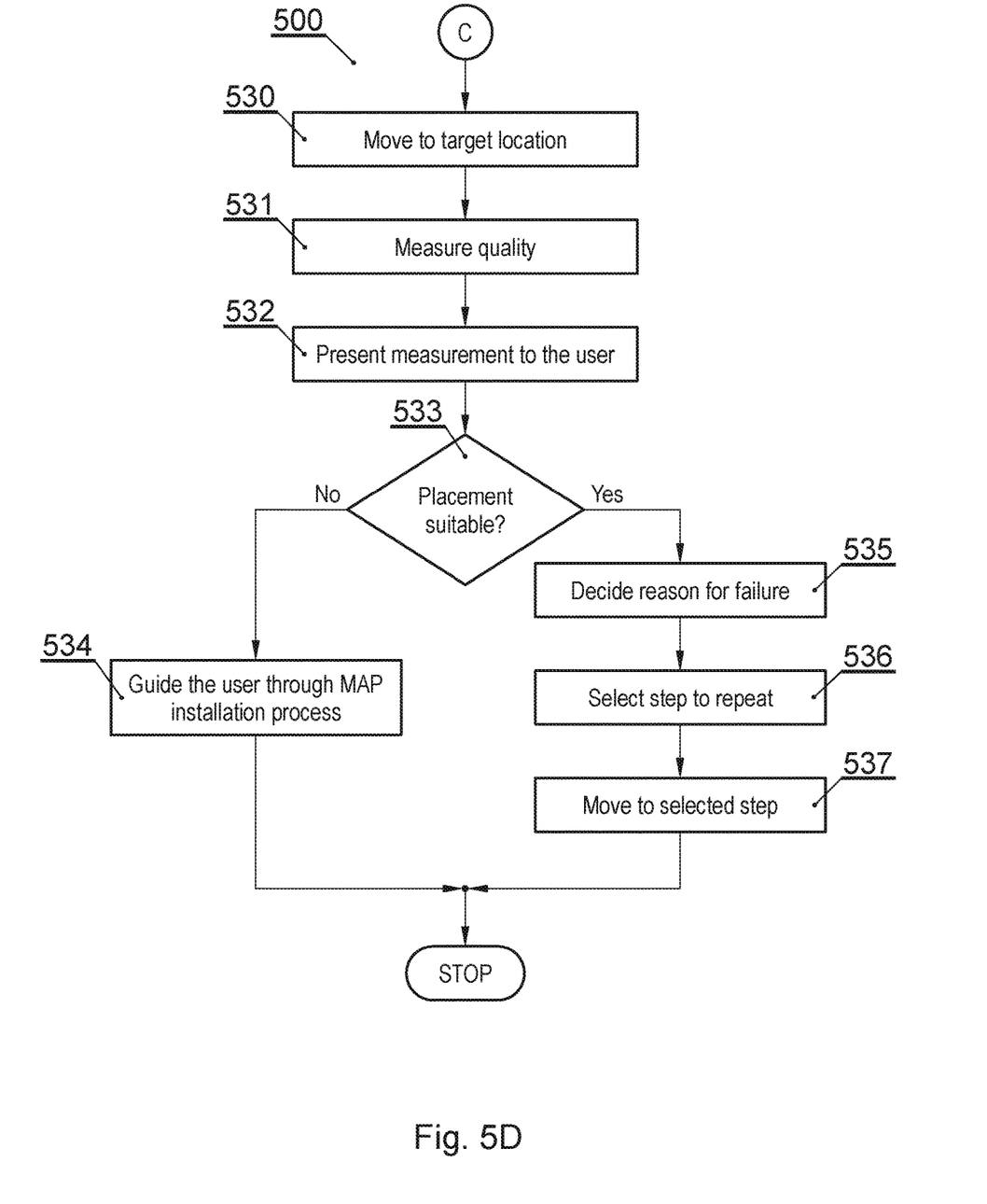

Step 530 begins the realization of step 404 of method 400. At step 530 the method 500 requests the user to move to the selected target location. A skilled person will appreciate that the location may be the exact location of one of the measure points but may also be some derivative of a plurality of locations. This is in no way limiting to the present invention.

Further, at step 531, the measurement of quality is done for the target location and is presented to the user at step 532. The step 532 constitutes the step 405 of the method 400. Next, the method 500 checks, at step 533, whether the target location is suitable. The check may comprise a validation of the quality measurement 531 at the target location against the optimal value calculated at step 520.

Typically, the check will also include an acceptance from the user. If the placement is suitable, the method moves on to an optional step 534 in order to guide the user through the MAP installation process and the method ends. This step constitutes the step 406 of method 400. However, if at step 533 the method 500 determined that the place is not suitable, it moves on to decide the reason at step 535 and to select based on that reason the appropriate step of the method 500 to go back to at step 536. Next, the method moves to that selected step at step 537.

A skilled person will appreciate that the method 500 may further be modified to include any feedback from steps 535 and 536 thus modifying its resulting target location with each iteration. This is not to be treated as a limitation but rather as an apparent improvement to the present invention.

Furthermore the present invention discloses a method of determining a coverage of a Wi-Fi mesh network and a method of calculation of a potential coverage of the said network in case a new MAP is placed at a particular measure point. Further, the present invention discloses an exemplary method of calculation of a score for a particular location.

Subsequent methods are depicted using an exemplary environment a layout of which is shown in FIG. 6. The layout 600 comprises 6 rooms 601 through 606, topology of which is unambiguously shown in FIG. 6. Furthermore, the description follows to use the term 'adjacent' which means sharing a common wall. For this particular layout, the exemplary rooms "Room A" and "Hall" are adjacent but the exemplary rooms "Living Room" and "Bathroom" are not adjacent.

Furthermore, the present description introduces a term 'distance' between two rooms (locations in general). The distance between A and B is understood as the length of the shortest possible sequence of rooms of which any next room is adjacent to at least previous room and the first of the sequence is A and last of the sequence is B.

In the exemplary environment the distance between "Room B" 601 and "Kitchen" 603 is 2, the distance between "Bathroom" 606 and "Hall" 605 is 1 and the distance between "Room A" and the same "Room A" is 0. The present description also refers to a distance between two measurement points in which case it means the distance between the rooms those measurement points are located in. A user is preferably guided through the setup process in order to obtain relevant data which will be processed in order to obtain MAP placement suggestion(s).

Since the present method of the present invention provides a way to select the best target location for a new MAP device, FIG. 7 and FIG. 8 present two possible placements of the new MAP 710 and 810 with the already present CAP 720.

FIG. 7 and FIG. 8 present schematic graphs 700 and 800 respectively of the layout 600 wherein any two adjacent rooms are connected and any two rooms that are not adjacent are not connected. The rooms are marked with respect to layout 600 of FIG. 6.

Additionally, an exemplary location of the CAP 720 is shown in both cases. The CAP 720 is located in room 602 i.e. the "Living Room". Each graph also shows the coverage of the CAP 720 represented as a plurality of measurement points 701 through 706. Said measurement points may be stored as records 507. The values presented for the measurement points 701 through 706 denote an exemplary scale of signal strength, 5 meaning the strongest possible signal and 0 or X meaning the weakest possible signal i.e. no detectable signal present.

A graph 700 presents an exemplary location of a MAP 710 in a room 601 "Room B". A graph 800 presents an exemplary location of a MAP 810 in a room 605 "Hall". Both graphs additionally present the potential coverage of their respective MAP devices 710 and 810. This potential coverage is marked 711 through 716 (see signal strength s per 701-706) for the MAP 710 and 811 through 816 for the MAP 810.

The method 900 of using the aforementioned potential coverage will be described with the respect to the presented FIGS. 6, 7 and 8. Furthermore, the potential coverage 716 denotes an unknown value. This is a direct and apparent result of using the method 900, notably step 908 as described below. It will become apparent to a skilled person that this value can be set to 0 or noted as unknown as marked in FIG. 7, element 716 and the presented methods will still remain valid as long as steps 910 and 911 of method 900 are adopted to comparing an unknown value e.g. the same as 0.

FIG. 9 presents the method 900 of using the already present coverage (in a form of measurements points 507) in order to compute a score for each measurement point obtained by the method 500.

This method constitutes the step 523 of the method 500. The method 900 begins at step 901 with a selection of a measurement point MP. Next, at step 902, the default value of score 0 is assumed. The method 900 assumes 0 being lowest and worst possible score. Any higher value will constitute a better score.

Subsequently, at step 903, the method checks for a next available room in the set of all rooms indicated by the user in the method 500. If no more rooms are available, the score is returned at step 904 for the given measurement point MP and the method ends.

If there are rooms available at step 903, the method moves to step 905 to select next room (a measure point in general, which may be associated with a given location i.e. a room) and then to step 906 to compute the average value of quality of signal for all measured points in this room i.e. whose distance to this room is 0. This value is referred to as Q hereinafter. A skilled person will appreciate that this does not need to be average value, it may as well be a median or any other mathematical formula suitable for the selected quality measure. This is not to be construed as limiting to the present invention.

Next, at step 907, the method computes the distance N from the MP to the currently selected room of step 905. Next, the process 900 moves to step 908 and finds all measurement points whose distance from their respective MAPs is equal to N. Next, at step 909, the average signal quality is computed for all points found in step 908.

A skilled person will appreciate that this does not need to be average value, it may as well be a median or any other mathematical formula suitable for the selected quality measure. This is not to be construed as limiting to the present invention. This value is stored as the potential quality for this room i.e. selected at step 905.

Next, at step 910, the method checks whether the computed potential signal quality is better than the average quality Q for this room/location. If so the method updates the score at step 911. The score becomes the higher the higher the difference between potential quality and quality Q is. Next, the process 900 moves back to step 903 to check for the availability of a next room. If at step 910 the computed potential signal quality is not better than the average quality Q for this room the method moves back to step 903 to check for the availability of a next room.

Typically, subsequent actions will be the steps 525 and 526 of method 500 and step 526 will select the highest score provided by method 900, namely step 904, to be the target location.

A skilled person will appreciate that the initial quality measured for the MP selected at step 901 may and typically will be a factor in the computation of the score. An exemplary modification may comprise reduction in score for very high and very low values of the initial quality of MP to discourage the use of such point as a target location.

It is apparent to a one skilled in the art that the method will typically be executed for each and every measurement point. Typically, the measurement point with the best score will subsequently be selected or a combination of top two or top three or the like. The selected point is suggested to the user as a target location at step 526.

A skilled person will also notice that the specifics of the presented methods may not be applied mutatis mutandis to a variant of the method 400 where the optional step 402 is omitted. However, it will become apparent that it is merely the case of definition of the distance between measure points that makes all further description unambiguous. Hence, an exemplary embodiment of the distance may be a threshold difference between the quality of signal of the considered measurement points of rooms. Another exemplary embodiment of the distance may be a Euclidean distance between two points triangulated by measuring the signal of all available MAPs, the unit of such triangulation being e.g. the RSSI value.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for an optimized placement of Wi-Fi Mesh network extenders may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for determining placement of a wireless, mesh network extender, the method comprising the steps of:
   establishing a connection with a wireless mesh network comprising a Central Access Point;
   the method being characterized in that it comprises the steps of:
      building a list of points of measurement of signal quality of said wireless, mesh network;
      defining a plurality of relations between pairs of measurement points; and
      outputting a suggestion as to the placement of a new Mesh Access Point on a calculation of potential signal quality derived from said list.

2. The method according to claim 1 wherein said list of points of measurement of signal quality of said wireless, mesh network comprises points in space denoting signal strength of said network.

3. The method according to claim 1 wherein a relation defines points belonging to the same room.

4. The method according to claim 1 wherein said potential signal quality is based on a score assigned.

5. The method according to claim 1 wherein said score assigned is assigned as a result of a method comprising the steps of:
   selecting a measurement point (MP);
   assuming a default value of its score;
   checking for a next available measurement point and if present, computing a quality measure for all measured points in the associated location;
   computing a distance N from the measurement point (MP) to the currently selected location;
   finding all measurement points whose distance from their respective Mesh Access Points is equal to N;
   computing combined signal quality for all measurement points found at the finding step in order to arrive at a potential signal quality;
   checking whether the computed potential signal quality is better than said quality measure for all measured points in the associated location and if it is, updating the score;
   moving back to the step of checking for a next available measurement point and repeating the remaining steps in order to find the highest available potential signal quality.

6. The method according to claim 1 wherein said method further comprises a step of obtaining a measurement of the quality of said wireless, mesh network at the suggested target location and providing a feedback.

7. The method according to claim 1 wherein said measurement of signal quality is selected from a group of:
   a normalized value of RSSI;
   an RSSI value from the Central Access Point or a Mesh Access Point that the respective measuring client device is connected to; and
   data transfer rate to or from a specific location on the network.

8. A non-transitory computer readable medium storing computer-executable instructions performing all the steps of the computer-implemented method according to claim 1 when executed on a computer.

* * * * *